United States Patent Office 3,082,858
Patented Mar. 26, 1963

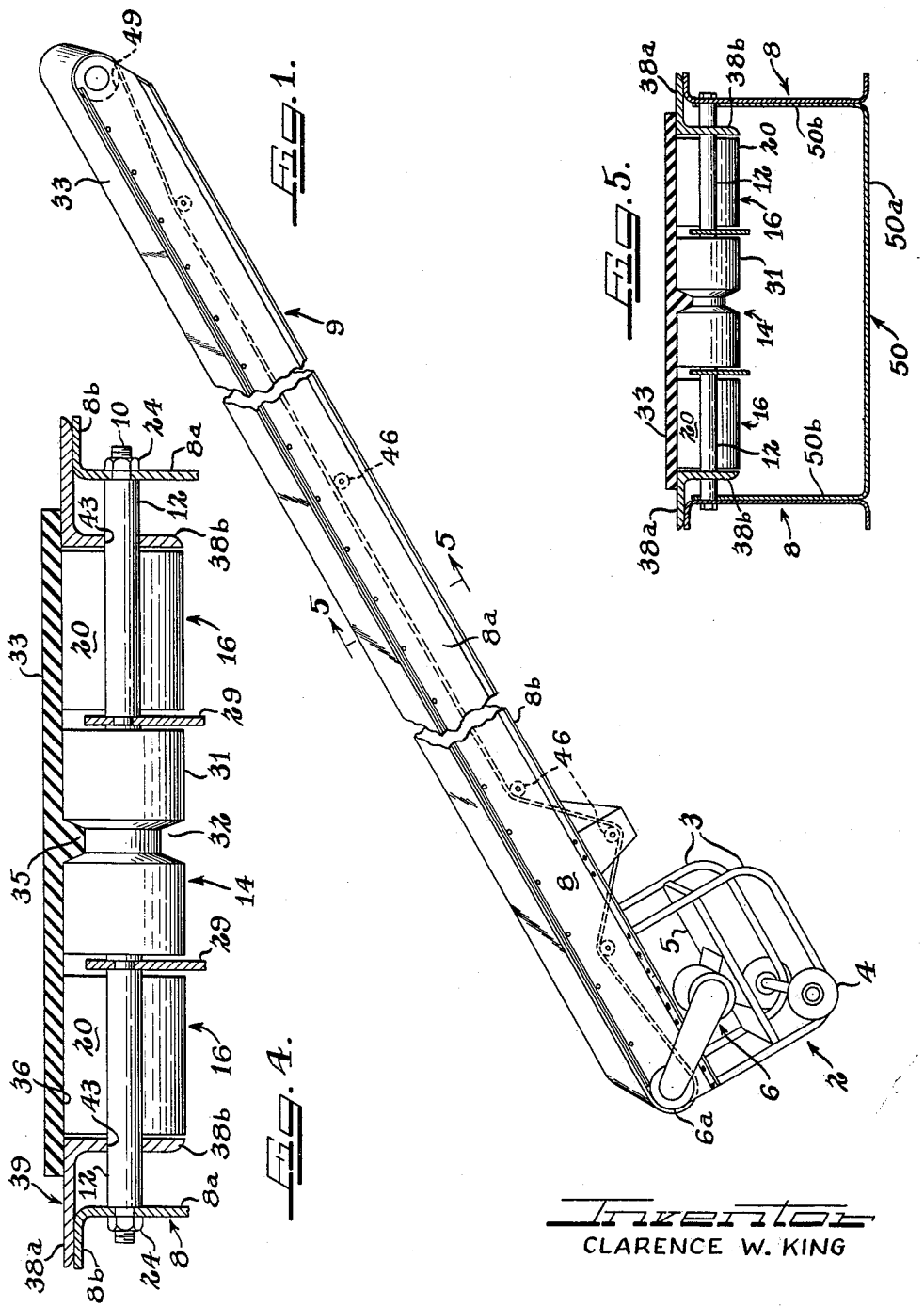

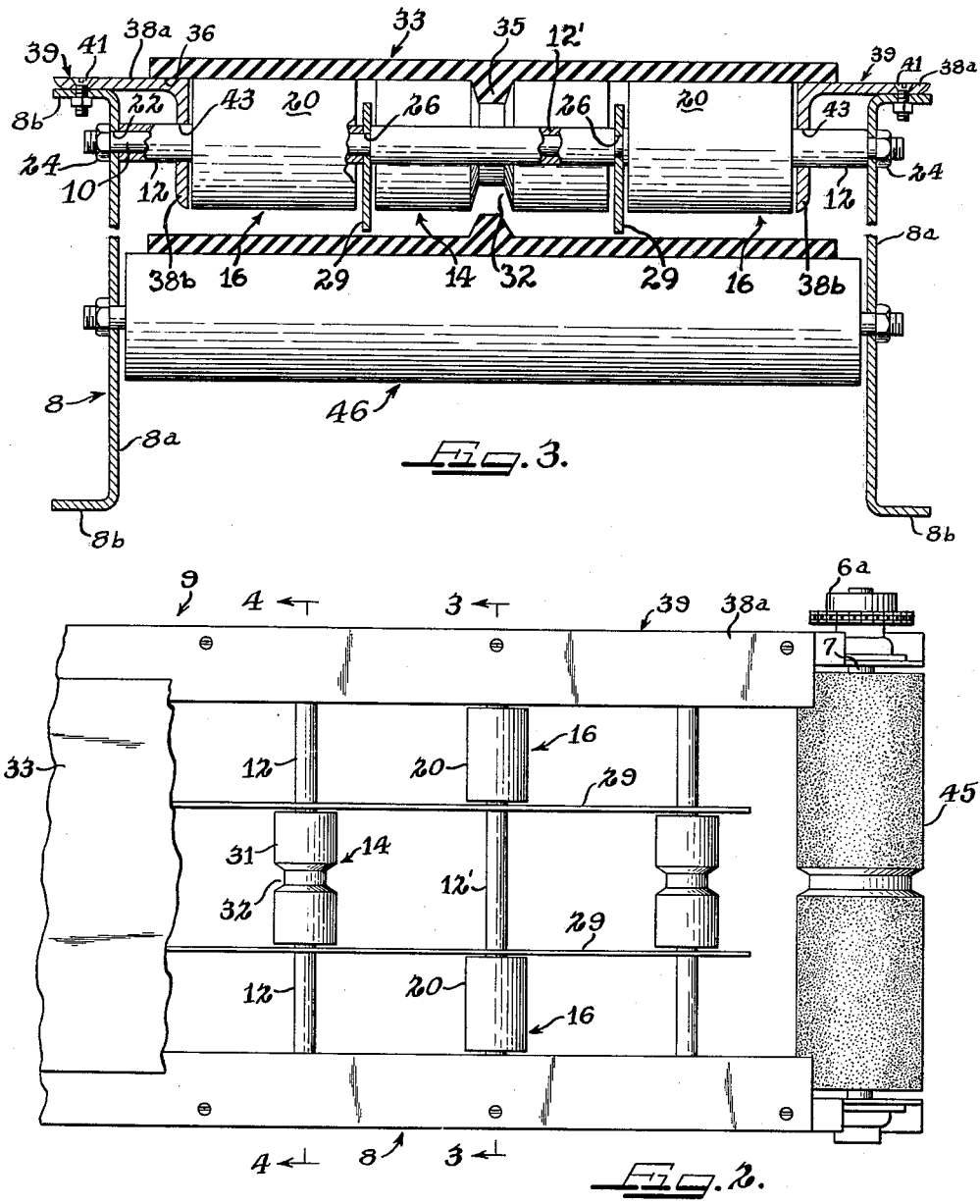

3,082,858
BELT CONVEYOR SYSTEM
Clarence W. King, Deerfield, Ill., assignor to Conveyor Systems, Inc., Morton Grove, Ill., a corporation of Illinois
Filed Aug. 3, 1961, Ser. No. 129,116
2 Claims. (Cl. 198—108)

This invention relates to a belt conveyor of the type wherein the upper section of a continuous flat belt is supported by a series of longitudinally spaced, cylindrical rollers rotatably supported for free rotation upon shafts or pivot rods extending between a pair of side frame members. Normally, the cylindrical rollers extend beyond the longitudinal margins of the upper section of the belt to insure support for the belt along the entire width thereof. Clearance spaces are, accordingly, left between the ends of the rollers and the side frame members and also between the belt and side frame members between the rollers. These clearance spaces are particularly objectionable when the belt conveyor is used to carry articles which have projecting portions thereof which might pass through these clearance openings and get caught on the rollers or the aforesaid shafts or rods or other projecting portions of the conveyor apparatus located below the upper section of the belt. This problem is particularly acute when the conveyor is used to carry mail bags or the like having tie-ropes for closing off the mouths of the bags.

In accordance with the present invention, the aforementioned belt supporting rollers are shortened so that the upper section of the belt extends beyond the outermost ends of the rollers. The marginal portions of the belt which extend beyond the ends of the shortened rollers are supported by a guard member secured to the aforesaid side frame members and underlapping the marginal portions of the belt. The guard member thus serves two functions; it supports the ends of the belt beyond the belt supporting rollers, and covers all clearance spaces between the side frame members and the upper section of the belt.

In accordance with a more specific aspect of the invention, the guard members are each formed by the laterally disposed leg of an angle member, the other leg of the angle member being oriented so that it depends from the horizontal leg on the inside of the angle member so as to extend adjacent the shortened ends of the belt supporting rollers. The aforesaid roller shafts or pivot rods pass through openings in the depending legs of the angle members to be supported thereby at relatively closely spaced points within the side frame members of the conveyor. This feature greatly improves the strength and rigidity of the entire conveyor.

Still another feature of the invention is to provide in the conveyor described above a belt which has a projecting rib on the inner surface thereof which rib rides within a groove formed in the belt supporting rollers. This feature keeps the belt running straight so that it cannot run off-center.

An exemplary and preferred form of the invention will now be described in the specification to follow and the claims, taken in conjunction with the drawings wherein:

FIG. 1 is a side elevational view of a conveyor incorporating features of the present invention which has been inclined to carry articles from a lower to a higher elevation;

FIG. 2 is a partially broken away plan view of the bottom or feed end of the conveyor;

FIG. 3 is a transverse section of the portion of the conveyor shown in FIG. 2, taken substantially along the line 3—3 therein;

FIG. 4 is a transverse section of the conveyor, taken substantially along the lines 4—4 in FIG. 2; and FIG. 5 is a transverse section through the middle portion of the conveyor, taken substantially along the line 5—5 in FIG. 1.

As shown in FIG. 1, the conveyor illustrated includes a feed end frame section 2 having a framework of tubular members 3 carrying a pair of casters or wheels 4—4 for enabling the conveyor to be readily moved about. The tubular framework 3 has a horizontal platform 5 which carries a drive motor and chain assembly 6. The driven end of the assembly 6 includes a sprocket wheel 6a fixed to a drive shaft 7 extending between a pair of laterally spaced elongated side frame members 8—8 attached to the upper portion of the framework 2 and forming a conveyor belt support structure generally indicated at 9. The side frame members as illustrated are channel members having a vertical web 8a and upper and lower flanges 8b—8b. The channel members are positioned so that the upper and lower flanges face outwardly. A number of transversely extending parts to be described interconnect the side frame members to form a rigid frame structure. These parts include a series of transverse pivot-forming rods 10—10 and surrounding outer and central cylindrical spacer sleeves 12—12'. The central sleeves 12' of the alternate rods rotatably support a central group of rollers 14. A first group of outer rollers 16 are rotatably mounted on sleeves 12 carried on the other rods located between the rods carrying the central group of rollers 14. A second group of outer rollers 16 are rotatably mounted on sleeves 12 at the opposite ends of said other rods.

The rollers making up the outer group of rollers 16—16 are identified individually by reference numeral 20 and each comprises a smooth surfaced cylindrical roller made of wood or other suitable material having a central bore through which one of the rods 10 and the surrounding sleeves 12 pass. The ends of the rods extend through openings 22—22 formed in the webs 8a—8a of the side frame members 8—8. Nuts 24—24 are threaded over the ends of the rods 10 on the outside of the side frame members. The rods also pass through correspondingly sized openings 26—26 in a pair of partition-forming plate members 29—29 extending the length of the belt supporting framework 9. An outer spacer sleeve 12 on each rod 10 extends between the outer side of each of the partition-forming plates 29 and the web 8a of the adjacent side frame member 8. A similar spacer sleeve 12' on each rod 10 extends around the rod 10 between the partition-forming plates 29—29. As indicated above, no roller surrounds the central spacer sleeve 12' on the rods carrying the outer rollers 20—20.

The spacer rods 10 associated with the central group of rollers 14 carry the spacer sleeves 12 and 12' and the partition-forming members 29—29 in the manner just described for the other rods. Although there are no rollers 20 shown surrounding the outer sleeves 12—12 of these rods, for heavy duty application rollers 20 could be placed on the latter rods. A generally cylindrical roller 31 made of wood or other material extends around the central sleeve 12' of each of these rods. Each of the rollers 31 has a generally truncated V-shaped annular groove 32 formed therein, the grooves 32 of the various rollers 31 being in longitudinal alignment.

As illustrated, the top surfaces of the various outer and central rollers 20 and 31 are located in a common plane positioned slightly above the top of the upper flanges 8b of the side frame members. The upper section of a continuous flat belt 33 made of a thick rubber composition material is supported on top of the rollers, the belt having a truncated V-shaped rib 35 projecting inwardly from the inner surface thereof. The belt is otherwise flat on its outer and inner surfaces. The rib 35 is complementary in shape to the annular grooves 32 in the central rollers 31 and fits snugly in the grooves 32 which align the upper section of the belt to prevent the belt from running off-center.

The outer ends of the outer rollers 20—20 are spaced appreciably from the webs 8a—8a of the side frame members, and the longitudinal margins of the upper sections of the belt 33 extend beyond the outer ends of the latter rollers 20—20 but terminate well short of the side frame members. In accordance with an important aspect of the present invention, the longitudinal marginal portions of the upper section of the belt 33 which extend beyond the outer rollers 20—20 are underlapped and supported by the horizontal legs 38a of a pair of angle members 39—39 secured to the side frame members. The flat upper surfaces of the angle member legs 38a are in the same plane as the flat bottom surface 36 of the upper section of the belt 33. The angle members are oriented with the other legs 38b—38b depending from the horizontal legs 38a—38a on the inside of the angle members. The horizontal legs 38a—38a are secured in any suitable way as by nut and bolt assemblies 41 to the upper flanges of the side frame members 8—8.

The depending legs 38b—38b of the angle members are contiguous to the outer ends of the outer rollers 20. The various pivot-forming rods 10 and their outer sleeves 12 pass through openings 43 in the depending angle member legs 38b—38b. The rods 10 are thereby supported not only by the side frame members 8—8 but also by the more closely spaced angle member legs 38b—38b. The angle members 39—39 thus perform three important functions. Firstly, they support the longitudinal marginal portions of the belt 33 extending beyond the rollers 20—20. Secondly, they cover over all clearance spaces between the belt and the rollers 20—20, on the one hand, and the side frame members 8—8, on the other hand. Thirdly, they form relatively closely spaced points of support for the pivot-forming rods 10 and their associated sleeves 12 to form a very strong and rigid structure.

The lower end of the continuous belt 33 passes down around a rough-surfaced grooved cylindrical feed roller 45 (best shown in FIG. 2) fixedly secured to the drive shaft 7, and then extends on top of and beneath various idler rollers as best shown in FIG. 1 and generally indicated by reference numeral 46. The upper end of the belt passes around an end idler roller 49.

The belt supporting framework 9 including the side frame members 8—8 and the other parts described above may be constructed in separate sections to facilitate the manufacturing thereof. The number of sections needed in a given conveyor depends upon the desired length of the belt supporting framework 9. The various sections may be connected in any suitable way (not shown).

When the conveyor is in an inclined position shown in FIG. 1, the upper end of the conveyor will rest upon some elevated support, and when it is used to convey articles in the horizontal plane, the outer end of the conveyor will rest upon a support which is at the same elevation as the end supported by the feed end framework 2. In either case, the central portion of the belt supporting framework 9 may need additional support, especially where it is a relatively long framework. To this end, an inverted channel-shaped sheet metal member 50 may be secured between the webs 8a—8a of the side frame members of the central section of the framework 9. This channel-shaped member has a central web 50a shown in FIG. 5 and a pair of side flanges 50b—50b which respectively extend upwardly along the inner faces of the webs 8a—8a of the side frame members 8—8. The webs 50b—50b have respective openings for receiving the aforementioned pivot-forming sleeves and rods.

It should be understood that numerous modifications may be made of the preferred form of the invention described above without deviating from the broader aspects of the present invention.

What I claim as new and desire to protect by Letters Patent of the United States is:

1. A conveyor comprising: a frame having laterally spaced, vertically oriented side frame members, a plurality of rods extending between the upper portions of said side frame members, securing means on the outside of said side frame members for holding the rods on said side frame members and bracing said side frame member against outward displacement, said rods carrying shoulder-forming means which engage the inner faces at said side frame members to hold said side frame members against relative inward displacement, an upper group of longitudinally spaced transversely extending belt supporting rollers rotatably mounted around said rods, a continuous belt having an upper section forming a support surface supported by said rollers, the longitudinal margins of said belt being spaced from said side frame members, the outermost ends of said rollers terminating short of the longitudinal margins of said belt, angle member means on each side of said frame and extending substantially the full length of the conveyor, the angle member means having laterally outwardly extending leg means at the top thereof secured to the top of the adjacent side frame member, said leg means contacting the bottom surface of said belt to support the same beyond said rollers and to bridge the space between the associated side frame member and the belt to prevent projecting end portions of articles carried by the belt from reaching and catching upon the rollers or other portions of the conveyor beneath the belt, said angle member means further having depending leg means on the inside thereof located adjacent the outermost ends of said rollers, said rods around which said rollers are rotatably mounted passing through the depending leg means of the angle member means on each side of the frame where the latter leg means acts as additional points of support spaced inwardly of said side frame members.

2. The combination of claim 1 wherein said shoulder-forming means include spacer sleeves surrounding said rods and forming a rigid bracing support between the side frame members.

References Cited in the file of this patent

UNITED STATES PATENTS

| 1,444,743 | Haiss | Feb. 6, 1923 |
| 2,591,237 | Collis | Apr. 1, 1952 |
| 2,895,593 | McKnight | July 21, 1959 |

FOREIGN PATENTS

| 770,320 | France | Sept. 12, 1934 |